United States Patent [19]
Sulollari

[11] Patent Number: 6,006,605
[45] Date of Patent: Dec. 28, 1999

[54] LEVEL MAINTAINING APPARATUS FOR A LIQUID

[76] Inventor: Enver Sulollari, 4909 Lester Rd., Tallahassee, Fla. 32311

[21] Appl. No.: 09/153,162

[22] Filed: Sep. 15, 1998

[51] Int. Cl.$^6$ ..................................................... G01F 23/30
[52] U.S. Cl. ................................................................ 73/306
[58] Field of Search ........................... 73/305–309, 314, 73/316, 317, 322, 327

[56] References Cited

U.S. PATENT DOCUMENTS

| | | |
|---|---|---|
| 2,505,350 | 4/1950 | De Giers .................................... 73/317 |
| 4,155,877 | 5/1979 | Wall . |
| 4,181,021 | 1/1980 | Harris et al. ............................... 73/317 |
| 4,445,238 | 5/1984 | Maxhimer . |
| 4,586,532 | 5/1986 | Tsolkas . |
| 4,592,098 | 6/1986 | Magnes . |
| 4,625,549 | 12/1986 | Mahoney .................................... 73/327 |
| 4,686,718 | 8/1987 | Kinkead et al. . |
| 4,732,035 | 3/1988 | Lagergren et al. . |
| 4,914,943 | 4/1990 | Lagergren . |
| 5,203,038 | 4/1993 | Gibbs . |
| 5,253,374 | 10/1993 | Langill . |
| 5,351,036 | 9/1994 | Brown et al. . |
| 5,426,271 | 6/1995 | Clark et al. . |
| 5,551,290 | 9/1996 | Spiegel . |
| 5,614,831 | 3/1997 | Edvardsson . |

*Primary Examiner*—Benjamin R. Fuller
*Assistant Examiner*—Jewel Thompson
*Attorney, Agent, or Firm*—Nexsen Pruet Jacobs & Pollard, LLP

[57] ABSTRACT

An apparatus for automatically maintaining a level of water in a pool reservoir comprising a housing which includes a transmitter/receiver device, a logic circuit in communication with the transmitter/receiver device, a valve assembly controlled by the logic circuit, and a water inlet and a water outlet in communication with the valve assembly. In addition to the housing, the apparatus also comprises a power supply connected to the housing, a float in communication with the housing, the float pivotally connected at a front portion of the housing facing a reservoir, the float further riding a surface of the reservoir, and a flag in communication with the float, the flag positioned to come into a parallel position with the transmitter/receiver.

11 Claims, 3 Drawing Sheets

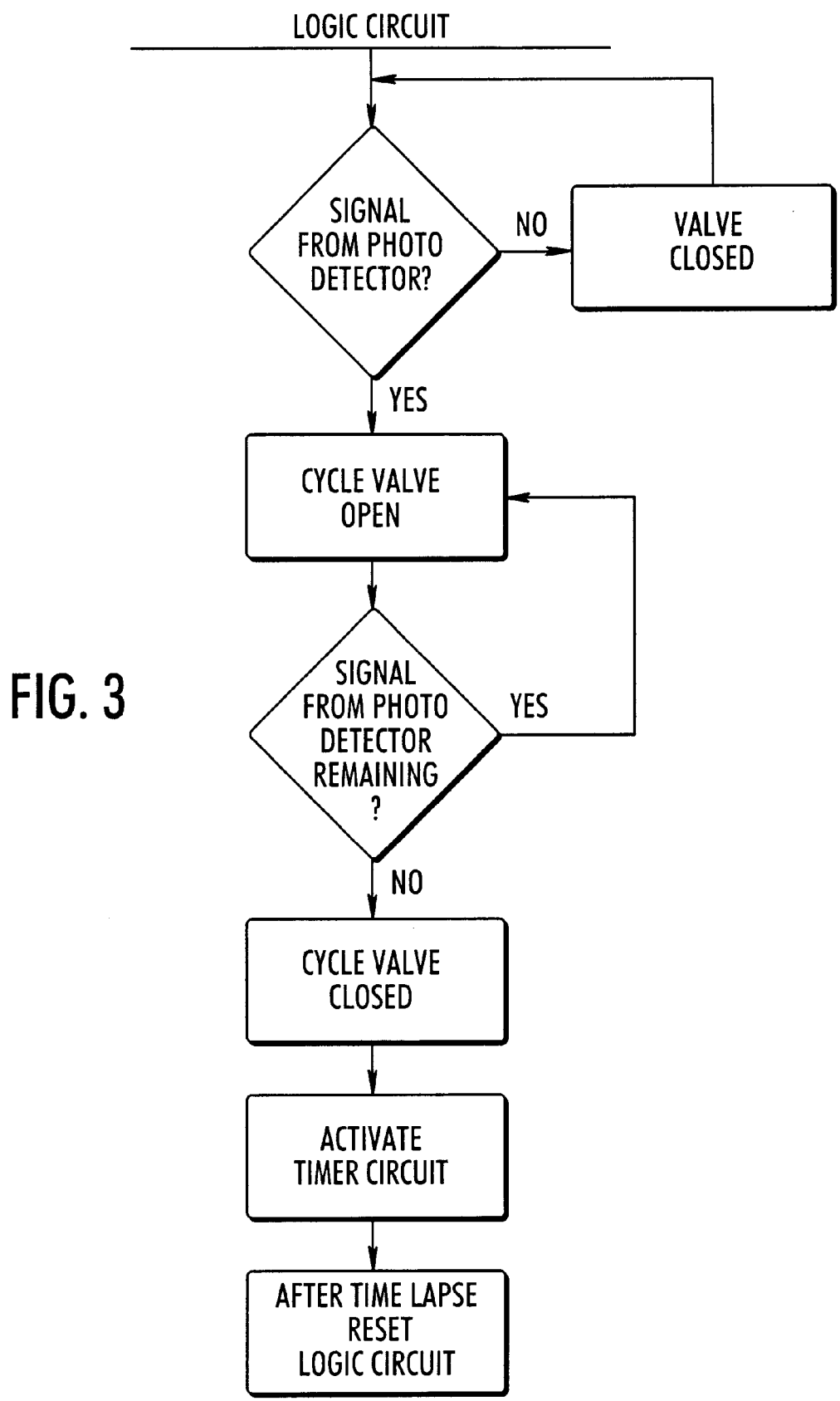

LEVEL MAINTAINING APPARATUS FOR A LIQUID

FIELD OF THE INVENTION

This invention relates to swimming pools and, more particularly, to an apparatus for controlling the level of water in a swimming pool and for controlling the flow of water to the swimming pool from a location remote from the swimming pool.

BACKGROUND OF THE INVENTION

There are several ways to monitor and control the level of a liquid in a reservoir, particularly a swimming pool. The most primitive way to monitor and control the level of a liquid is by visual inspection and manually filling. Because manually controlling the level of a liquid in a reservoir, such as a pool, is not usually a feasible alternative, various systems have been developed for automatically controlling liquid levels, particularly the water level in a pool.

U.S. Pat. No 4,445,238 to Maxhimer discloses an apparatus for remotely sensing the water level in a pool and turning on and off a flow of water via a control valve. In Maxhimer, water is drawn from a skimmer reservoir of a pool into a cylinder, the level in the cylinder thus reflecting the height of water in the pool. As the water level in the cylinder changes, a float in the cylinder either allows an photo detector to detect light from an LED, activating water flow, or disrupts the light detection by the photo detector.

U.S. Pat. No. 5,203,038 to Gibbs discloses an apparatus for maintaining a water level in a swimming pool. The level sensing device includes a floatation element operable to float on the surface of the water and having a floatation arm connected to the valve assembly to open and close the water conduit. The floatation element has a sensing device attached to the end portion of the main body for sensing variations in the level of fluid. Accordingly, the need exists for a water level maintenance apparatus which is operable with swimming pools having a wide range of configurations.

SUMMARY OF THE INVENTION

It is thus an object of the present invention to provide a water level sensing device.

It is another object of the present invention to provide a water level sensing device for sensing and automatically returning the water level of a reservoir to an acceptable level.

It is a further object of the present invention to provide a water level sensing device which will detect when the water level has receded below a certain level and generate a signal to allow water to flow into the reservoir and return the water level to an acceptable level.

It is yet another object of the present invention to provide a water level sensing device which will prevent excessive cycling of the sensing device.

BRIEF DESCRIPTION OF THE DRAWINGS

FIG. 3 is a flow diagram of the level control apparatus' logic circuit.

DETAILED DESCRIPTION OF THE INVENTION

Figure 1:
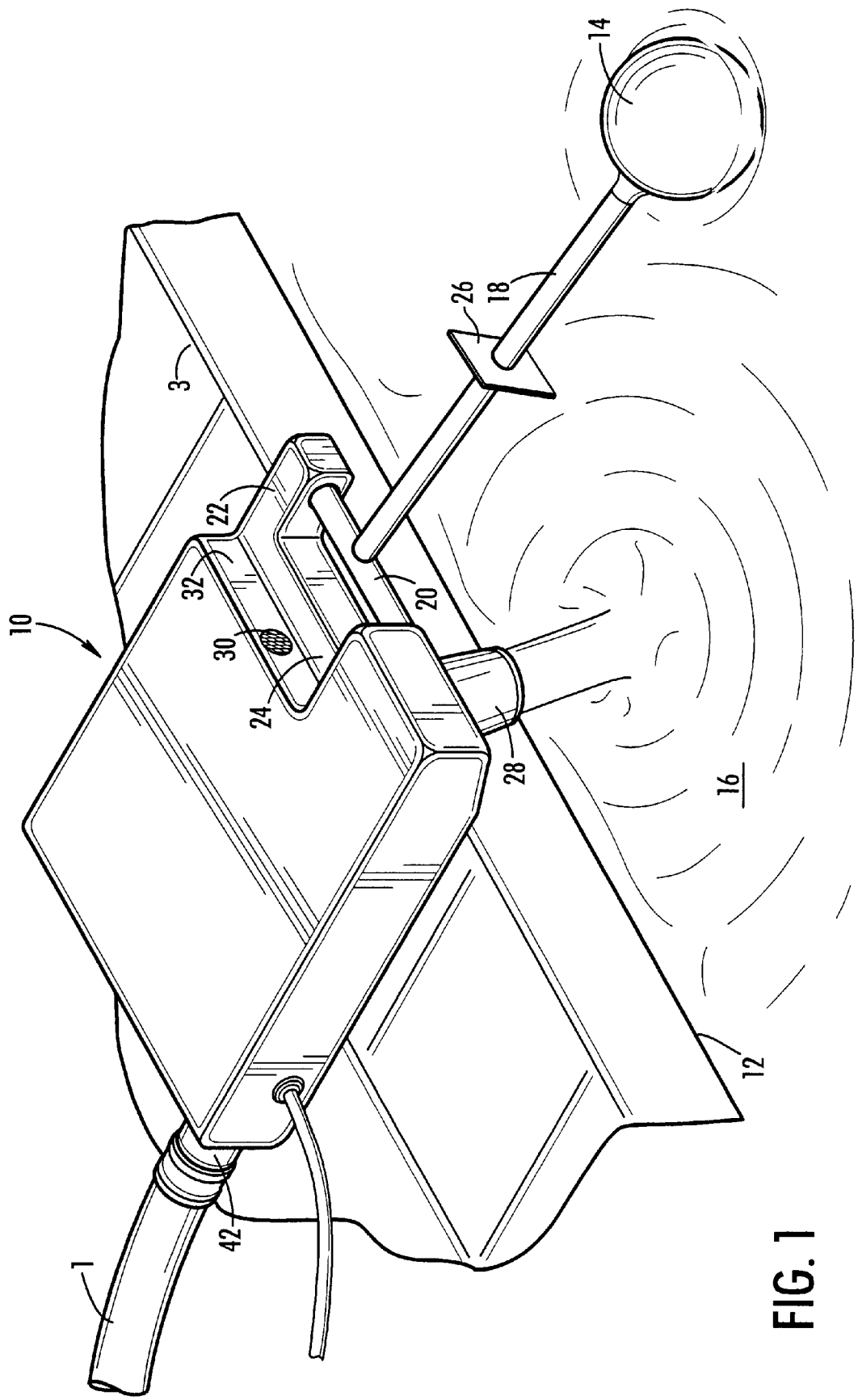
FIG. 1 is a broken-away perspective view of the reservoir level control apparatus adjacent a pool.

In FIG. 1, the preferred embodiment of the level maintaining apparatus 10 of the present invention is illustrated. The level maintaining apparatus 10 is preferably made of a heavy-duty plastic material. However, the apparatus 10 may comprise any durable material that will stand up to a moist environment and avoid rusting. In a preferred embodiment of the invention, the apparatus 10 is intended to be placed on the side of a reservoir and held in place by its own weight. However, the apparatus may be secured to the side of the reservoir if the user prefers. In a preferred embodiment, D.C. power is supplied to the apparatus 10 through a conventional transformer plugged into an indoor/outdoor AC electrical socket. However, power may be supplied by an alternate source, such as a generator or other power supply.

The liquid level maintaining apparatus 10 is preferably positioned adjacent a reservoir of water 12, such as a swimming pool, such that the float 14 of the apparatus 10 is resting on the surface of the water 16. The float 14 is connected to an arm portion 18 which is extended sufficiently over the reservoir 12 such that the movement of the arm 18 is not substantially restricted by the edge 3 of the reservoir. In a preferred embodiment, the float 14, which is made of a light-weight material such as plastic, may be removably mounted onto the arm 18. However, the float 14 may be permanently secured to the arm 18 without changing the scope of the invention.

Arm 18 is in communication with a pivotal bar 20 which allows the arm 18 to move upwardly and downwardly in response to a change in the water level of reservoir 12. Pivotal bar 20 is in communication with the inside portion of a first arm 22 and a second arm 24 of the apparatus 10 and is rotational within inserts (not shown) located in each arm 22 and 24.

Mounted onto arm 18 is a flag 26. Flag 26, in a preferred embodiment, is a durable plastic. Flag 26 may, however, be a metal or other reflective material. Flag 26 is preferably mounted securely onto arm 18. Flag 26 may, however, be slidably mounted or in snap-fit relation with arm 18. As the water level of the reservoir 12 rises or falls, flag 26 travels in a direction perpendicular to the front portion 32 of the apparatus until flag 26 comes into a predetermined positioning with a transmitter/receiver unit 30 positioned on a front portion 32 of the apparatus 10. In a preferred embodiment, the transmitter/receiver 30 provides a microwave signal (not shown) which is projected in a forward direction. The predetermined positioning of the flag is in the path of the signal emitted by the transmitter/receiver 30. Instead of using microwave, the transmitter/receiver may be configured to operate as an ultrasonic sensor or a simple mechanical valve.

Figure 2:
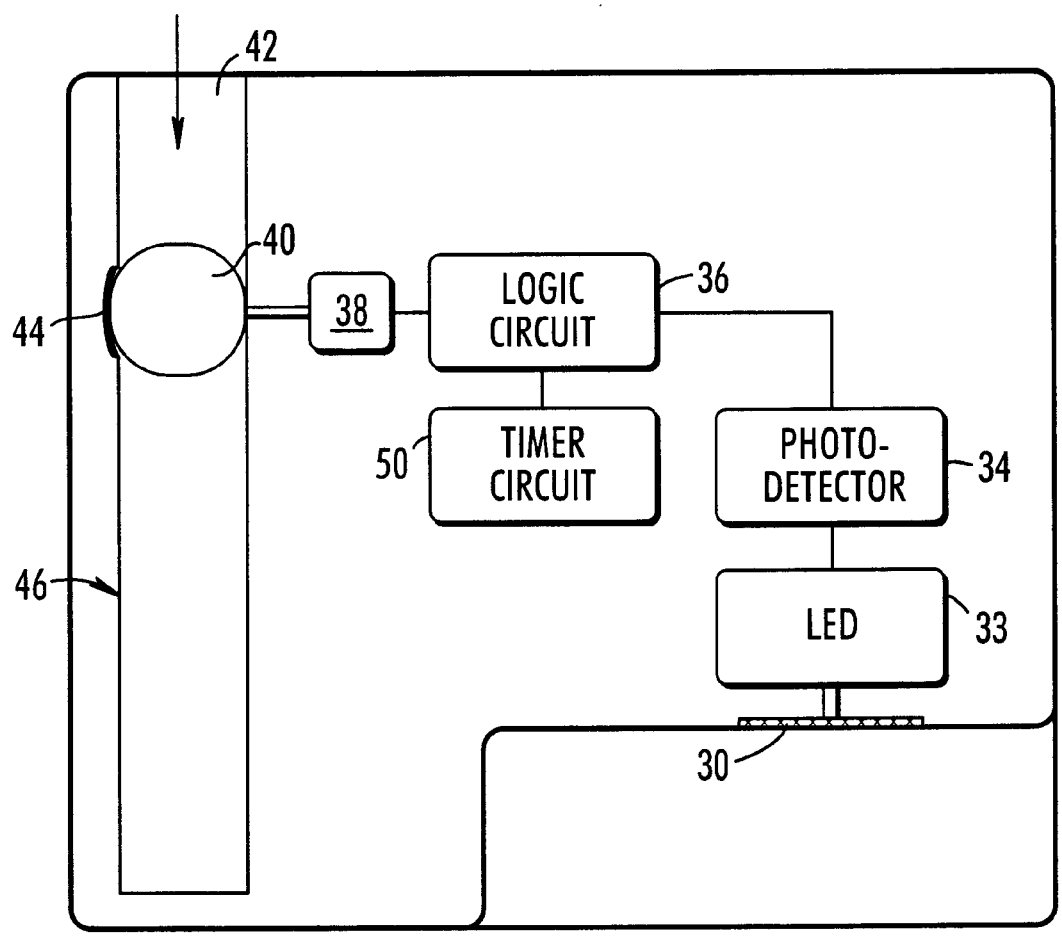
FIG. 2 is a schematic view of the reservoir level control apparatus and its control systems.

If the flag 26 comes into the path of the signal emitted from the transmitter/receiver 30, the flag 26 reflects the signal back to the transmitter/receiver 30. The flag may move upwardly or downwardly into the signal path. In any instance, as long as a microwave signal is reflected back by the flag 26 and received by the transmitter/receiver 30, water level in the reservoir 12 is determined to be at an adequate level. If at any time the signal is not reflected back to the transmitter/receiver 30, e.g., when the water level has dropped such that the flag 26 is no longer in predetermined positioning with the transmitter/receiver, water is allowed to flow into the reservoir 12 via a water outlet 28 positioned over the reservoir 12. The scope of the invention is not limited to reservoirs of water, however. The apparatus 10 may be used to detect the level of any liquid such as the level of oil in a barrel, or the level of grain in a grain silo. In the embodiment of the present invention, however, the level of a swimming pool is sought to be detected. A source of water for the swimming pool is provided by a conventional garden hose connected to the apparatus 10 at the water inlet 42 (FIG. 2). In a preferred embodiment the garden hose is maintained in a pressurized condition.

With reference to FIG. 2, the preferred embodiment of the liquid level control apparatus 10 is further described. In the absence of the reflected microwave signal by the transmitter/receiver 30 from flag 26, a signal is generated and processed within the transmitter/receiver 30, the signal being received by an LED 33 within the transmitter/receiver 30. In a preferred embodiment of the invention, light generated by the LED 33 impinges on photo detector 34, photo detector 34 further generating and processing a signal which activates a logic circuit 36. Photo detector 34 may, however, be replaced with a photoelectric cell.

Logic circuit 36, as further described in FIG. 3, triggers the activation of a valve control apparatus 38. In a preferred embodiment, the valve control apparatus 38 is a reversible gear motor. The valve control apparatus 38 may, however, be a solenoid, or some other valve control mechanism. Upon activation by logic circuit 36, valve control apparatus 38 opens valve 40 so that water is allowed to flow from water inlet 42, past valve seat 44, through water line 46 and into reservoir 12 via outlet 28. Upon the restoration of the microwave signal reflected by the flag 26 and received by the transmitter/receiver 30, the logic circuit 36 returns the valve 40 to a closed position seated upon valve seat 44.

Once valve 40 has been fully cycled, open and closed, by the logic circuit 36, logic circuit 36 then activates timer circuit 50. Timer circuit 50 allows a certain period of time to lapse before the logic circuit 36 can subsequently activate the valve control apparatus 38. The timer circuit may be externally set by the apparatus user or the apparatus may be supplied with a predetermined internal setting. In a preferred embodiment, the lapsed time is a predetermined internally set time of thirty (30) minutes. However, this time may be any appropriate time.

In addition, the timing circuit 50 may be replaced with a mechanical trip mechanism like the ones found on most dishwashers. In any instance, the purpose of the timing circuit 50 is to avoid the excessive cycling of the valve control apparatus 38, and possible motor burnout, in the event water level changes are due to something other than a loss of water from the pool such as a disturbance of the water due to a storm or an object falling into the pool while the apparatus 10 is still in communication with the reservoir 12.

Thus a novel reservoir level control apparatus has been described. The microwave transmitter/receiver, valve circuitry and timing circuitry, however, are all conventional. It will, therefore, be readily understood by those persons skilled in the art that the present invention is susceptible of broad utility and application. Many embodiments and adaptations of the present invention other than those described, as well as many variations, modifications and equivalent arrangements will be apparent from or reasonably suggested by the present invention and foregoing description thereof, without departing from the substance or scope of the present invention. The foregoing disclosure is not intended to be construed to limit the present invention or otherwise to exclude any such other embodiments, adaptations, variations, modifications and equivalent arrangements, the present invention being limited only by the claims appended hereto and the equivalents thereof.

What is claimed is:

1. An apparatus for automatically maintaining a level of water in a pool reservoir comprising:
    a housing, including:
        a transmitter/receiver device;
        a logic circuit in communication with said transmitter/receiver device;
        a valve assembly controlled by said logic circuit; and
        a water inlet and a water outlet in communication with said valve assembly;
    a power supply connected to said housing;
    a float in communication with said housing; and
    a flag in communication with said float, said flag positioned to come into a predetermined position with said transmitter/receiver.

2. The apparatus of claim 1 wherein said transmitter/receiver emits a microwave signal.

3. The apparatus of claim 2 wherein said flag, when said flag is in said predetermined position with said transmitter/receiver, reflects said microwave signal back to said transmitter/receiver.

4. The apparatus of claim 3 wherein said flag is secured onto an arm portion of said float, said arm pivotally connected at a front portion of said housing facing a reservoir such that said float is riding a surface of said reservoir;.

5. The apparatus of claim 3 wherein said transmitter/receiver further comprises an LED, said LED, upon detecting said microwave signal reflected by said flag, producing light which impinges onto a photo detector, said photo detector generating a signal to said logic circuit.

6. The apparatus of claim 1 wherein said logic circuit maintains said valve assembly in a closed position when said receiver/transmitter receives said reflected microwave signal, and wherein said logic circuit actuates a valve control mechanism which cycles said valve assembly between an open and a closed position, said logic circuit actuating said mechanism in the absence of said reflected microwave signal; and said logic circuit actuating said mechanism to return said valve assembly to said closed position upon restoration of said reflected microwave signal to said transmitter/receiver.

7. The apparatus of claim 6 wherein said valve assembly is in communication with an aperture extending through said housing.

8. The apparatus of claim 1 wherein said power supply to said housing is a D.C. supply.

9. The apparatus of claim 8 wherein said power supply is an A.C. supply rectified to said D.C. supply.

10. The apparatus of claim 6 wherein said logic circuit actuates a timing circuit upon said valve control mechanism returning said valve assembly from said open position to said closed position.

11. The apparatus of claim 10 wherein said timing circuit delays subsequent actuation of said valve motor by said logic circuit for a period of time.

\* \* \* \* \*